(12) United States Patent
Dullien

(10) Patent No.: US 6,383,263 B1
(45) Date of Patent: May 7, 2002

(54) DEVICE INTENDED FOR MECHANICAL SEPARATION OF HIGH-TEMPERATURE SAND PRESENT IN A GAS STREAM

(75) Inventor: Francis A. L. Dullien, RR #Drumbo, Ontario (CA), N0J 1G0

(73) Assignees: Francis A. L. Dullien, Ontario (CA); Institut Francais du Petrole, Rueil-Malmaison (FR)

( * ) Notice: Subject to any disclaimer, the term of this patent is extended or adjusted under 35 U.S.C. 154(b) by 0 days.

(21) Appl. No.: 09/582,789
(22) PCT Filed: Nov. 3, 1999
(86) PCT No.: PCT/FR99/02680
  § 371 Date: Jul. 5, 2000
  § 102(e) Date: Jul. 5, 2000
(87) PCT Pub. No.: WO00/27501
  PCT Pub. Date: May 18, 2000

(30) Foreign Application Priority Data
  Nov. 5, 1998 (FR) .............................. 98 13975

(51) Int. Cl.[7] .............................................. B01D 50/00
(52) U.S. Cl. .......................... 95/267; 55/315; 55/342; 55/428; 55/467; 209/135; 209/142; 164/5; 241/DIG. 10

(58) Field of Search ..................... 55/315, 318, 319, 55/342, 428, 467, 522; 209/134, 135, 142, 143; 164/5; 241/65, DIG. 10; 95/267

(56) References Cited

U.S. PATENT DOCUMENTS

| | | | | |
|---|---|---|---|---|
| 197,897 A | * | 12/1877 | Rice | ........................... 209/142 |
| 948,062 A | * | 2/1910 | Morgan | ........................ 55/315 |
| 4,508,277 A | * | 4/1985 | Andrews | ...................... 241/65 |
| 5,505,434 A | * | 4/1996 | Lilja et al. | .................... 266/44 |

* cited by examiner

Primary Examiner—Robert A. Hopkins
(74) Attorney, Agent, or Firm—Antonelli, Terry, Stout & Kraus, LLP

(57) ABSTRACT

A process for separation of solid particles of wide grain size distribution present in a turbulent gas stream includes, first, removal of the coarser particles in a separation chamber (1) with a high efficiency, then removal, with a high efficiency, of the remaining finer particles in a precipitation device (20). An assembly intended for separation of solid particles of wide grain size distribution present in a turbulent gas stream includes a separation chamber (1) intended to receive the solid particles in suspension and to remove from the stream the major part of the coarser particles, and a precipitation device (20) intended to separate the finer particles from the stream.

11 Claims, 2 Drawing Sheets

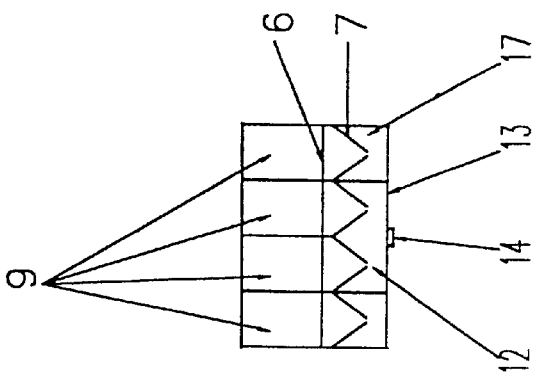
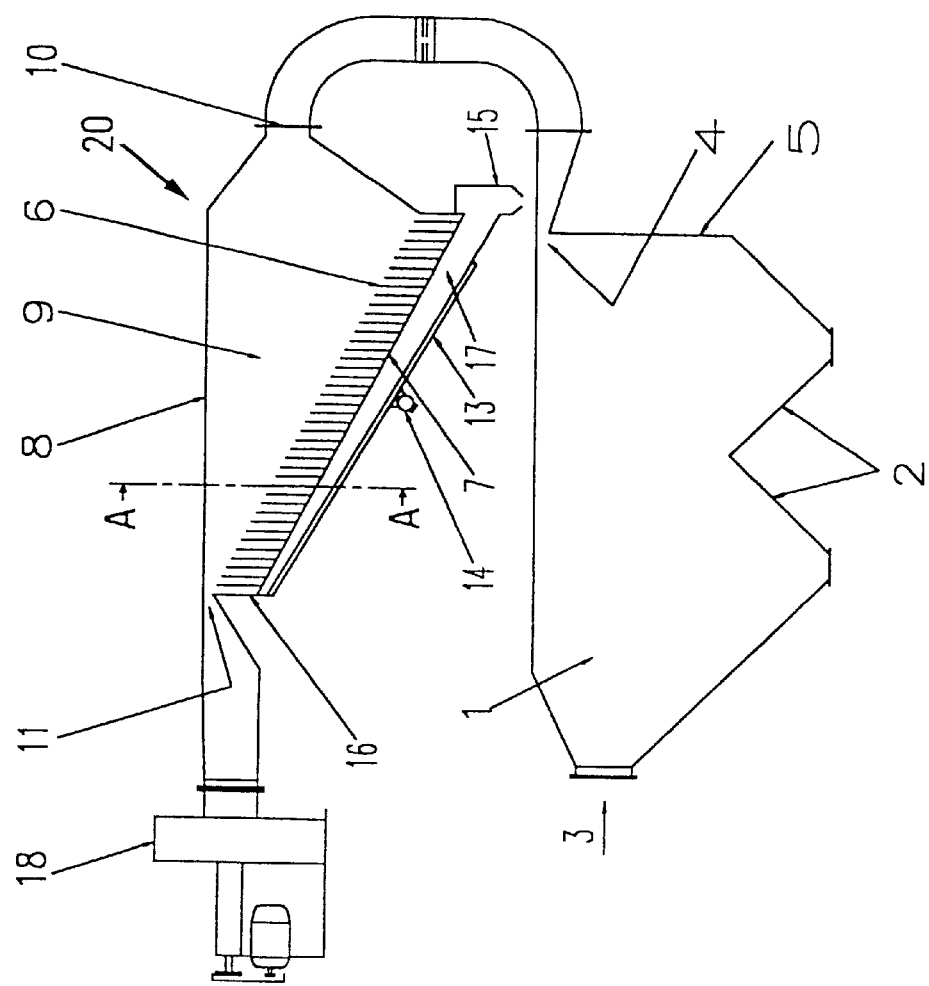

DEVICE INTENDED FOR MECHANICAL SEPARATION OF HIGH-TEMPERATURE SAND PRESENT IN A GAS STREAM

FIELD OF THE INVENTION

The present invention relates both to the improvements made to particle separators and to separation of sand of wide grain size distribution resulting from a thermal regeneration process and present in a high-temperature gas stream.

BACKGROUND OF THE INVENTION

U.S. Pat. No. 5,626,651 and international patent application WO-97/27,928 (see also British patent 2,264,655 published on May 24, 1995) describe a certain number of forms of particle separators intended for separation of particles carried along in a turbulent gas stream. These disclosures are taken up here by way of reference.

In the description hereafter, the present invention is explained within the scope of the separation of sand particles present in a turbulent high-temperature gas flow and having a grain size distribution ranging between about 1 micron (lower limit) and about 100 microns (upper limit). Such a particle-containing gas is a by-product obtained within the scope of foundry sand regeneration processes.

It is however clear that this illustration of the present invention relative to the separation of solid particles contained in a turbulent gas flow is not intended to limit the more wide-ranging scope of the present invention, the invention being also applicable to the separation of other solid particles suspended in a turbulent gas flow.

It has been discovered that sand grains of a size above about 30 microns tend to bounce on the collector plates of a precipitation device as described in U.S. Pat. No. 5,626,651 or in the corresponding European patent EP-B1-626,880; this reduces the efficiency of their removal from the gas streams. It has also been observed that the intensity of the bounce of the sand grains on the collector plates and the resulting efficiency loss increase with the size of the grains. Removal of the sand fraction consisting of sand grains of a size above about 30 microns would therefore require construction of precipitation devices with plates of very great length whose cost would be prohibitive because of the very large number of collector plates required.

The other problem connected with separation of large-size sand grains by means of plate precipitation devices lies in the tendency of this sand grains to erode the collector plates, which leads to unjustified expenses in order to replace the plates and concomitant interruption of the process of removing the sand present in the gas stream.

SUMMARY OF THE INVENTION

The object of the present invention is notably to overcome the aforementioned drawbacks by proposing a process and a set of particle separators allowing to remove the sand grains of a size above about 30 microns present in a gas stream before they enter another device, a precipitation device for example. This objective is reached by using a means specially designed for efficient separation of particles such as sand grains of a size above about 30 microns present in a gas stream.

The object of the present invention is a process intended for separation of solid particles of wide grain size distribution present in a turbulent gas stream, first comprising removal of the coarser particles in a separation chamber with a high efficiency. Separation is completed by removal, with a high efficiency, of the remaining finer particles in a suitable device, a plate precipitation or a porous-structure device pierced with channels for example.

The present invention can thus be defined, on the one hand, as a process intended for separation of sand grains of wide grain size distribution present in a turbulent gas stream, first comprising removing the sand fraction consisting of large-size sand grains in a separation chamber provided therefore, then removing the remaining fine sand grains in a plate precipitation device or an equivalent device (porous structure with channels) whose length is much less than that required for efficient removal of the large grain size sand if the gas stream had been directly fed into a separation device such as a plate precipitation device.

The stage of removal of the large-size sand grains carried along by the turbulent gas stream consists in passing the stream into the separation chamber so as to reduce the velocity of flow of said gas stream and to cause said particles to settle under the action of gravity over a short distance in the gas stream, then possibly to hit the back wall of said chamber and to fall down along the wall, where the gas has a viscous flow at very low velocity, onto the bottom of said chamber.

The invention furthermore relates to the use of such a process intended for separation of sand grains carried along by a high-temperature gas stream, said stream coming from a thermal sand regeneration process.

The invention also relates to an assembly intended for separation of solid particles of wide grain size distribution present in a turbulent gas stream, comprising: (a) a separation chamber intended to receive said high-temperature turbulent gas stream containing said particles and to remove from said stream the major part of said particles of larger size, and (b) a precipitation device intended to receive the stream coming from the separation chamber and to collect the finer particles present in the stream.

The separation chamber can comprise a horizontal line provided with an inlet port intended to receive the stream and another line intended for discharge of said stream, connected to a horizontal slot in the back wall of the chamber extending over the total width of the chamber and situated at the upper end of said chamber. The separation chamber also comprises lower parts which taper at the lower end, in which the larger particles are collected after being removed from the gas stream.

The sand (larger grains) can be discharged into containers from said chamber.

More precisely, the plate precipitation device comprises:
an inlet for the particle-containing gas stream and frontally an outlet for the gas stream from which particles have been removed,
a housing provided with a horizontal upper part and a first trough-shaped bottom with an ascending slope in relation to the direction of flow of the gas stream,
a plurality of equidistant collector plates, substantially of equal height, cooperating with said trough-shaped bottom 7,
a gas flow passage delimited by the upper edges of the plates, the upper part of the housing and the lateral walls of the housing,
means arranged at the lower point of said trough-shaped bottom, halfway between two adjacent collector plates, through which the fine particles caught by the plates are discharged,
a second bottom substantially parallel to said trough-shaped bottom, on which the fine particles discharged through said means fall and slide downwards, at least one dust discharge port at the lower end of said second bottom associated with a line connected to said dust discharge port, a dust discharge channel between the two bottoms of the housing, a wall separating the gas flow passage and the dust discharge channel.

In another variant, the precipitation device comprises at least one porous structure, cross-linked foam for example, pierced with channels through which the gas containing the remaining particles circulates with a turbulent flow.

The separation assembly according to the invention can also comprise a gas stream suction means.

The plate precipitation device belonging to the combination described above can have the form of any device described in the aforementioned patents and preferably comprises plates of equal height mounted, with an ascending slope in relation to the direction of flow of the gas, on the bottom of a housing having a horizontal upper end, which provides a passage of decreasing height for the gas stream. The bottom is trough-shaped and comprises, at the lowest point thereof small-diameter holes through which the fine sand is discharged into a second bottom on which it slides prior to being discharged through a port into a line connected to a container. Peridoc activation of a vibrator arranged on the outer surface of the second bottom contributes to discharge of the fine dust.

The precipitation device provided with a porous structure pierced with channels can be similar to those described in patent applications FR-2,777,801 and FR-2,769,517 mentioned here by way of reference.

BRIEF DESCRIPTION OF THE DRAWINGS

FIG. 1 shows the global arrangement of an assembly comprising a separation chamber and a plate precipitation device according to a preferred embodiment of the present invention.

FIG. 2 is a sectional view of the plate precipitation device along section AA of FIG. 1.

DETAILED DESCRIPTION

Figure 3:
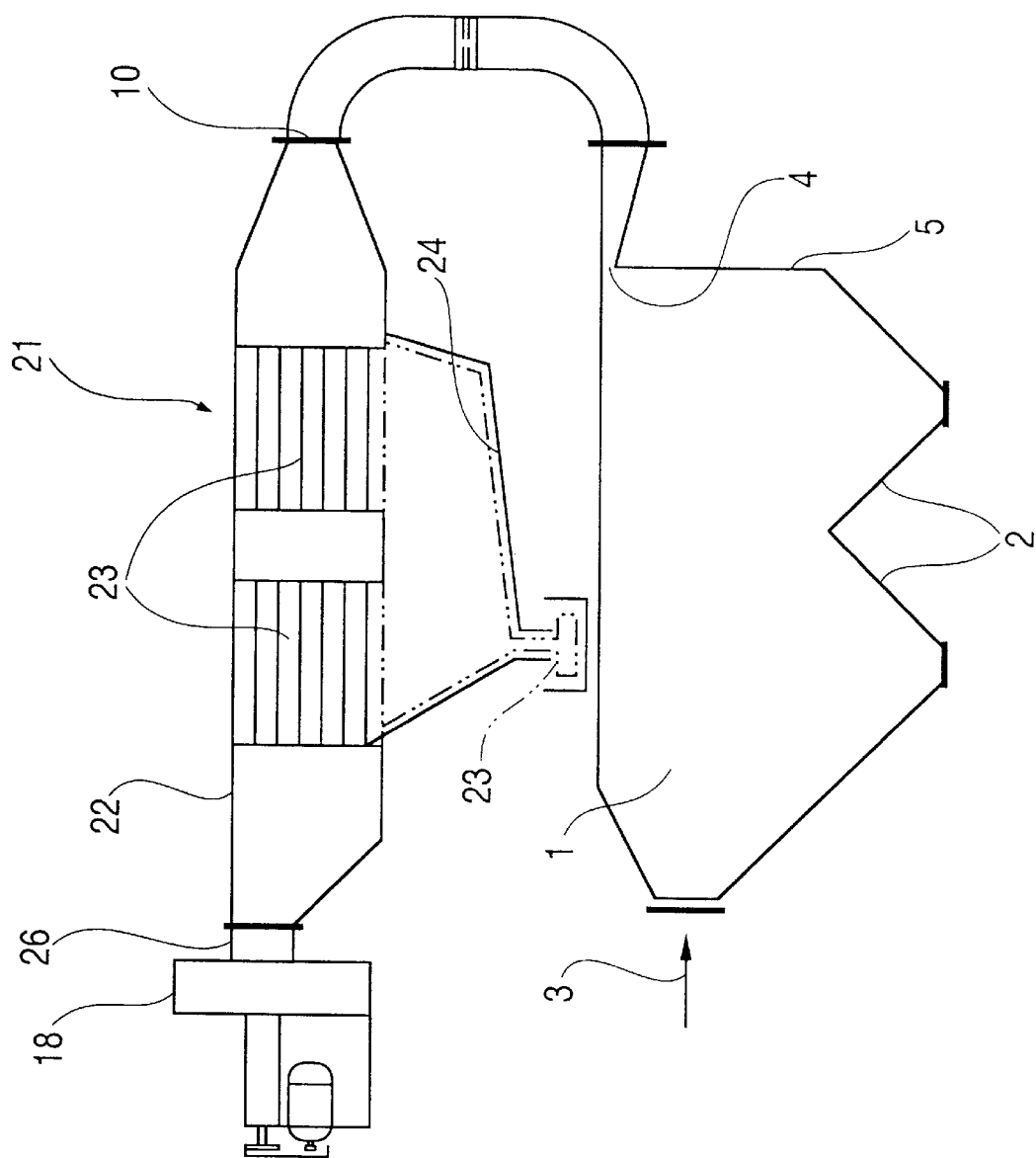
FIG. 3 shows another variant wherein the separation device is followed by a separation device with precipitation in a porous structure pierced with channels.

A separation device is shown in the lower part of FIG. 1 and it consists of a chamber 1 provided with lower parts 2 that taper downwards, an axial circular gas inlet line 3 and a slot-shaped outlet 4 extending over the total width of chamber 1 and situated at the upper end of a back wall 5 of chamber 1.

According to this embodiment of the invention, the elevated position of slot-shaped outlet 4 in relation to the bottom of the chamber is at least equal to the distance over which the sand grains having a size of about 30 microns settle during the time of residence of the gas in chamber 1. The particles of larger size settle higher and a great number thereof falls into hoppers 2 before they reach back wall 5. However, most of the sand grains of a size equal to or greater than 30 microns hit back wall 5 of the chamber.

The 30-micron value is given here for information only.

It has been experimentally discovered that with a low gas flow velocity, of the order of 1 m/s, in chamber 1, the sand grains do not bounce on wall 5 after hitting it, but they fall along the wall into the hopper which is the nearest to the outlet. Experience also shows that the sand falling along wall 5 is not recaptured and re-entrained by the gas. The physical reason therefore is that, on wall 5, the gas only has a viscous (non-turbulent) flow whose velocity is much lower than the settling velocity of the sand grains. The sand discharged into hoppers 2 is neither recaptured nor re-entrained because the velocity of collection of the sand grains is much higher than 1 m/s. The volume of chamber 1 is sized so that the velocity of the particle-containing sand is sufficiently low for the principle of settlement of the heavier particles thus described to take place.

A separation device 20 is shown in the upper part of FIG. 1. Device 20 has been improved in relation to the precipitation devices described in the prior art and in particular in the patents mentioned at the beginning of the description.

It mainly comprises a housing provided with a horizontal upper end 8 and sloping bottoms 7 and 13. Vertical collector plates 6 of substantially equal height are mounted on sloping bottom 7. The gas is fed into separation device 20 through a circular port 10. The height of gas flow passage 9 in the separation device decreases between inlet 10 and outlet 11. The fine sand grains suspended in the gas entering precipitation device 20 through inlet 10 are driven by the fluctuations of the turbulent flow velocity into spaces contained between the plates, where they hit and settle on plates 6. This phenomenon has already been explained in the prior art mentioned at the beginning of the description.

It has been experimentally discovered that the removal efficiency increases when the height of flow passage 9 is decreasing in relation to the direction of propagation of the turbulent gas stream. It has been observed that the finer particles settle on the plates located in the vicinity of the precipitation device outlet. Furthermore, after formation of a layer of fine dust on plates 6, it has been observed that the deposit comes off by itself under the action of gravity. The dust then falls from plates 6 onto trough-shaped bottom 7 of the precipitation device.

FIG. 2 shows a passage 9 divided into four identical sections. This is not compulsory. FIG. 2 shows that the shape of plates 6 is suited to the trough shape of bottom 7. Furthermore, bottom 7, two plates 6 and two walls form a cell comprising, at the lower central point thereof, a small-diameter circular hole 12 through which the dust is discharged into a section 17 provided with a bottom 13. Said dust slides along bottom 13, assisted by the intermittent activation of a vibrator 14 fastened to said bottom 13. The dust then enters a general dust discharge line 15 arranged at the bottom of the slope formed by the two bottoms. Dust discharge section 17 is separated from gas flow passage 9 by wall 16. The dust can finally be discharged into a container (not shown) connected to discharge line 15.

According to the invention, the gas successively flows through the combination consisting of separation chamber 1 and plate precipitation device 20 with the aid of a suction means 18 arranged downstream from outlet 11. Discharge and removal of the sand or of the dust present in this combination are performed continuously, without interruption of the gas flow and separation of solids from the gas.

By way of example of this invention, the following assembly can be mentioned: a separation chamber 1 and a plate precipitation device intended for processing of a gas flow of about 11,000 Am$^3$/h at a temperature ranging between 500 and 700° C. in which a foundry sand is carried along, has the following dimensions: length of separation chamber 1: 4.5 m, height (not including the tapered bottom): 1.6 m, width: 1.8 m. Gas outlet slot 4 is 15-cm high. 90% by weight of the sand are removed in chamber 1. Gas flow passage 9 of the plate precipitation device is 3.2 m long, 1.8 m wide, and its height decreases from 1.5 m at the inlet to 7.6 cm at outlet 11. Collector plates 6 are 32 cm high, with a 7.6-cm spacing between the plates. Dust discharge holes 12 are 13 mm in diameter. The thermal sand removal efficiency of the combination consisting of the separation chamber and the plate precipitation device is of the order of 99.5%. The plate precipitation device alone can remove only about 70% by weight of the thermal sand, hence the synergism between a type 1 separation chamber and the plate precipitation device. The physical reason for this synergism is that the large-size sand grains are removed more efficiently in separation chamber 1, whose separation principle can be referred to as << gravity separation >>, whereas the finer particles are removed more efficiently in plate precipitation device 20.

The performances of the separation chamber can be compared with those of a conventional horizontal gravity separator. In order to obtain a 100% removal efficiency for 30-micron diameter sand grains, a conventional horizontal gravity separator with the same height and width as the separation chamber described in the example above of the present invention must be about 48 m long, which is 11 times as great as the 4.5 m length of the separation chamber of the present invention. If it was decided that the height, the width and the length of a conventional horizontal gravity separator should have the same value, it has been calculated that these three dimensions would then be 9.4 m.

The performances of the separation chamber can also be compared with those of inertia separators of complex design which can reach a 90% removal efficiency for 30-micron sand grains, but at the cost of a pressure drop that is much higher than the 180 Pa measured in the separation chamber.

High-performance cyclone collectors can nearly reach a 100% removal efficiency for 30-micron sand grains, but also at the cost of a pressure drop much above 180 Pa.

The total thermal sand removal efficiency obtained with the combination according to the invention, of the order of 99.5%, is matched by no other known mechanical separator.

In the variant illustrated in FIG. 3, device 21 for separating the finer particles comprises a tubular line 22 connected to inlet 10 intended for the gas stream flowing out of chamber 1 and to outlet 26 on which a gas suction system can be mounted. Reference number 23 designates several blocks of porous material pierced with channels along the principal axis of line 22. The separation device can correspond to the device described in publication WO-99/19,044 corresponding to application FR-2,769,517. The porosity of the foam is greater than 90%, the size of the cells ranges between 0.5 and 5 mm. It is clear that it is an open-cell foam, i.e. the pores communicate with one another. These blocks are pierced with channels whose diameter ranges for example between 3 and 100 mm. It works as follows the turbulent particle-containing gas stream circulates in the parallel channels, without any notable pressure drop, and the particles enter the wall of the channels. A vibratory system can expel the particles out of the porous material and cause them to move towards a receptacle 24 which collects the particles in a tank 25.

According to the gas flow rate, line 21 can be more or less long and equipped with one or more porous blocks 23 arranged in series.

What is claimed is:

1. A process for separation of solid particles of wide grain size distribution carried along by a turbulent, high-temperature gas stream resulting from a thermal sand regeneration process, comprising first removing coarser particles in a separation chamber through gravity, then removing finer particles in a precipitation device.

2. A process as claimed in claim 1, wherein the stage of removal of the coarser particles carried along by the turbulent gas stream comprises passing said stream into the separation chamber so as to reduce the velocity of flow of said gas stream and to cause the coarser particles to settle under the effect of gravity, then to hit a back wall of said separation chamber and to fall along the wall into a lower part of said separation chamber.

3. A process as claimed in claim 1, wherein the grain size distribution of the particles ranges between 1 $\mu$m and about 100 $\mu$m.

4. A process for separation of solid particles having a grain size distribution ranging between 1 $\mu$m and about 100 $\mu$m present in a turbulent gas stream, comprising first removing coarser particles in a separation chamber through gravity, then removing finer particles in a precipitation device.

5. A process as claimed in claim 4, wherein the stage of removal of the coarser particles carried along by the turbulent gas stream comprises passing said stream into the separation chamber so as to reduce the velocity of flow of said gas stream and to cause the coarser particles to settle under the effect of gravity, then to hit a back wall of said separation chamber and to fall along the wall into a lower part of said separation chamber.

6. An assembly for separation of solid particles of wide grain size distribution present in a turbulent gas stream, comprising: a separation chamber intended to receive a high-temperature turbulent gas stream containing said solid particles in suspension and to remove from said stream larger particles under the effect of gravity, and a precipitation device which receives said stream coming from said separation chamber in order to remove finer particles from said stream, wherein said precipitation device comprises:

an inlet for the gas stream, connected to outlet of said separation chamber, and an outlet for the gas stream, a housing provided with a horizontal upper part and with a trough-shaped first bottom with an ascending slope in relation to the direction of flow of the gas stream, a plurality of equidistant collector plates substantially of equal height, cooperating with said trough-shaped bottom, a gas flow passage delimited by upper edges of said collector plates, the upper part of the housing and lateral walls of the housing, means arranged at the lowest point of said trough-shaped bottom, halfway between two adjacent collector plates, through which the finer particles collected by said collector plates are discharged, a second bottom substantially parallel to said trough-shaped bottom, on which the finer particles discharged through said means fall and slide downwards, at least one dust discharge port at the lower end of said second bottom, associated with a line connected to said dust discharge port, a dust discharge channel between the two bottoms of the housing, and a wall separating the gas flow passage and the dust discharge channel.

7. An assembly as claimed in claim 6, wherein said separation chamber comprises:

an inlet port for the stream and an outlet port for said stream in form of a horizontal slot provided in a back wall of said separation chamber extending over a total width of said separation chamber and arranged in an upper part of said back wall, and lower parts that taper at a lower end thereof, wherein the larger particles are collected after being removed from said gas stream.

8. An assembly for separation of solid particles of wide grain size distribution present in a turbulent gas stream, comprising: a separation chamber intended to receive a high-temperature turbulent gas stream containing said solid particles in suspension and to remove from said stream larger particles under the effect of gravity, and a precipitation device which receives said stream coming from said separation chamber in order to remove finer particles from said stream, wherein the precipitation device comprises at least one block of porous material arranged in a line which communicates with an outlet of said separation chamber, said block being pierced with channels in the direction of the principal axis of said line so that the gas stream circulates through said channels.

9. An assembly as claimed in claim 8, wherein the precipitation device comprises several blocks of porous material arranged in series and spaced out along said line.

10. An assembly as claimed in claim 8, wherein said precipitation device also comprises a gas stream suction means.

11. An assembly as claimed in claim 8, wherein said separation chamber comprises:

an inlet port for the stream and an outlet port for said stream in form of a horizontal slot provided in a back wall of said separation chamber extending over a total width of said separation chamber and arranged in an upper part of said back wall, and lower parts that taper at a lower end thereof, wherein the larger particles are collected after being removed from said gas stream.

* * * * *